(12) United States Patent
Finn et al.

(10) Patent No.: US 10,386,460 B2
(45) Date of Patent: Aug. 20, 2019

(54) SELF-CALIBRATING SENSOR FOR ELEVATOR AND AUTOMATIC DOOR SYSTEMS

(71) Applicant: Otis Elevator Company, Farmington, CT (US)

(72) Inventors: Alan Matthew Finn, Hebron, CT (US); Arthur Hsu, South Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 138 days.

(21) Appl. No.: 15/595,552

(22) Filed: May 15, 2017

(65) Prior Publication Data

US 2018/0329032 A1   Nov. 15, 2018

(51) Int. Cl.
| | |
|---|---|
| *G01S 7/40* | (2006.01) |
| *G01S 13/08* | (2006.01) |
| *E05F 15/73* | (2015.01) |
| *B66B 5/00* | (2006.01) |
| *G01B 21/04* | (2006.01) |
| *G01B 11/25* | (2006.01) |

(52) U.S. Cl.
CPC ............. *G01S 7/40* (2013.01); *B66B 5/0012* (2013.01); *E05F 15/73* (2015.01); *G01B 11/2513* (2013.01); *G01B 21/042* (2013.01); *G01S 13/08* (2013.01); *E05F 2015/765* (2015.01)

(58) Field of Classification Search
CPC ........................................................ G01S 7/40
USPC ........................................................ 73/1.79
See application file for complete search history.

(56) References Cited

U.S. PATENT DOCUMENTS

| | | |
|---|---|---|
| 5,168,136 A | 12/1992 | Thangavelu et al. |
| 5,219,042 A | 6/1993 | Sattar et al. |
| 5,243,155 A | 9/1993 | Sirag, Jr. |
| 5,329,076 A | 7/1994 | Kameli |
| 6,114,956 A | 9/2000 | Genechten |
| 7,623,674 B2 | 11/2009 | Nichani et al. |
| 7,965,866 B2 | 6/2011 | Wang et al. |
| 8,955,253 B2 | 2/2015 | Kanki et al. |

(Continued)

FOREIGN PATENT DOCUMENTS

| | | |
|---|---|---|
| CN | 104864873 A | 8/2015 |
| EP | 3075695 A1 | 10/2016 |
| WO | 2011054971 A2 | 5/2011 |

OTHER PUBLICATIONS

Jung et al., "Object Detection and Tracking-Based Camera Calibration for Normalized Human Height Estimation", Indexed in Science Citation Index Expanded, 2016, 6 pages.

(Continued)

*Primary Examiner* — Walter L Lindsay, Jr.
*Assistant Examiner* — Philipmarcus T Fadul
(74) *Attorney, Agent, or Firm* — Cantor Colburn LLP

(57) ABSTRACT

A self-calibrating sensor system is provided and includes one or more sensors supportively disposed on or proximate to a wall defining one or more apertures and a processor. Each of the one or more sensors is configured to track individuals proximate to at least one of the one or more apertures. The processor is configured to determine one or more of a location and an orientation of each of the one or more sensors relative to the at least one of the one or more apertures from analyses of the tracking of the individuals.

20 Claims, 5 Drawing Sheets

(56) References Cited

U.S. PATENT DOCUMENTS

| | | | |
|---|---|---|---|
| 2001/0021898 A1* | 9/2001 | Greer | G01B 11/00 |
| | | | 702/104 |
| 2003/0076271 A1 | 4/2003 | Borlez et al. | |
| 2004/0045339 A1 | 3/2004 | Nichani et al. | |
| 2005/0168574 A1 | 8/2005 | Lipton et al. | |
| 2006/0053342 A1 | 3/2006 | Bazakos et al. | |
| 2006/0187037 A1 | 8/2006 | Eubelen et al. | |
| 2008/0089577 A1 | 4/2008 | Wang | |
| 2008/0285802 A1 | 11/2008 | Bramblet et al. | |
| 2008/0306708 A1* | 12/2008 | Germain, IV | G01B 21/042 |
| | | | 702/153 |
| 2010/0013656 A1 | 1/2010 | Brown et al. | |
| 2010/0039217 A1 | 2/2010 | Borlez et al. | |
| 2011/0051992 A1 | 3/2011 | Cobb et al. | |
| 2013/0182905 A1* | 7/2013 | Myers | H04N 7/18 |
| | | | 382/103 |
| 2013/0251197 A1 | 9/2013 | Liu et al. | |
| 2014/0003710 A1 | 1/2014 | Seow et al. | |
| 2014/0312884 A1 | 10/2014 | Reilio et al. | |
| 2016/0289042 A1 | 10/2016 | Fang et al. | |
| 2016/0289044 A1 | 10/2016 | Hsu et al. | |
| 2016/0292515 A1 | 10/2016 | Jia et al. | |
| 2016/0292522 A1 | 10/2016 | Chen et al. | |

OTHER PUBLICATIONS

Search Report dated Oct. 24, 2018 in U320880EP, EP Application No. EP18172172, 8 pages.
Anonymous, "IDO sensors", online retrieve URL<http://www.idosensors.com/the-solution/>, 4 pages.
Anonymous, "Stop the false opening of automatic doors and save money!", online retrieve URL<http://www.idosensors.com/stop-the-false-opening-of-automatic-doors-and-save-money/>, 4 pages.
Bombini et al., "Intelligent Overhead Sensor for Sliding Doors: A Stereo Based Method for Augmented Efficiency", 2011, Abstract, 5 pages.
Yang et al., "An InAn Intelligent Automated Door Control System Based on a Smart Camera", Sensors, 2013, pp. 5923-5936.
Elbadramany, "Towards Calibration of Optical Flow of Crowd Videos Using Observed Trajectories", 2011, STARS Citation, 120 pages.
Kuramochi et al., "Recognition of Elevators with the Kinect Cane System for the Visually Impaired", 2014, IEEE,, 4 pages.
Liu et al., "Video Stabilization with a Depth Camera", 2012 IEEE, 7 pages.
Lladrovci, "Indoor navigation with motion tracking and depth perception sensors", 2016, Master's Thesis Master of Science in Applied Computer Science 30 ECTS, 69 pages.

* cited by examiner

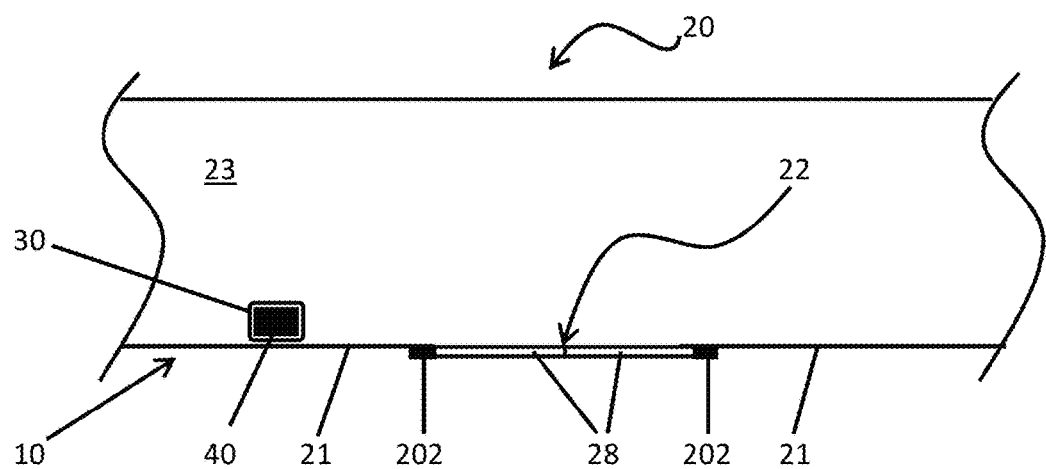
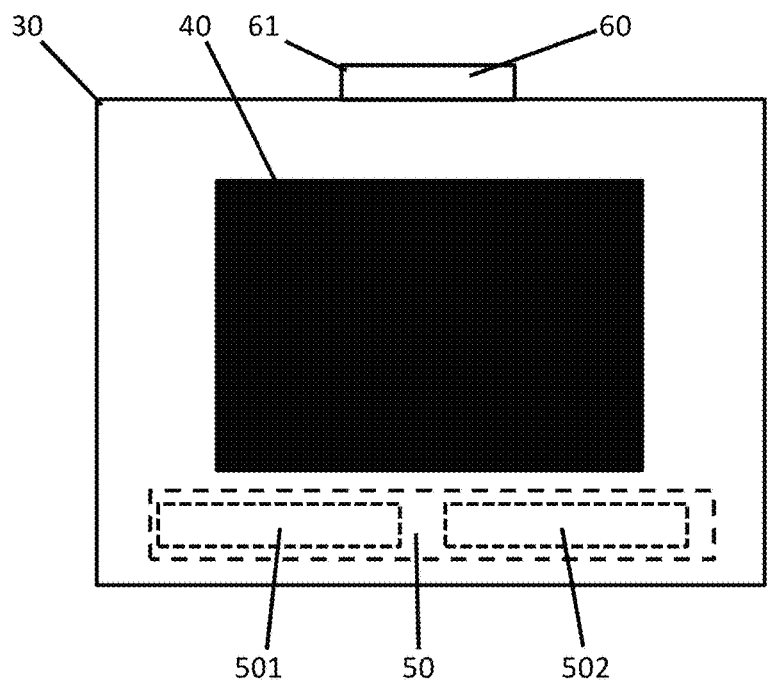

SELF-CALIBRATING SENSOR FOR ELEVATOR AND AUTOMATIC DOOR SYSTEMS

BACKGROUND

The following description relates to elevator systems and to automatic door systems and, more particularly, to a self-calibrating depth sensor for use with elevator systems and automatic door systems.

Conventional crowd sensors are typically mounted in a centered position over the elevator doors or automatic doors they are provided for. If the sensors are mounted off-center for any reason (i.e., due to architectural or aesthetic considerations), geometric parameters of the installation must be manually measured and entered into the corresponding systems.

BRIEF DESCRIPTION

According to one aspect of the disclosure, a self-calibrating sensor system is provided and includes one or more sensors supportively disposed on or proximate to a wall defining one or more apertures and a processor. Each of the one or more sensors is configured to track individuals proximate to at least one of the one or more apertures. The processor is configured to determine one or more of a location and an orientation of each of the one or more sensors relative to the at least one of the one or more apertures from analyses of the tracking of the individuals.

In accordance with additional or alternative embodiments, at least one of the one or more sensors includes a depth sensor.

In accordance with additional or alternative embodiments, the processor is configured to activate the one or more sensors to sense the individuals for tracking and to receive data associated with the sensing from the one or more sensors.

In accordance with additional or alternative embodiments, the processor activates the one or more sensors to sense the individuals for tracking in response to an external command.

In accordance with additional or alternative embodiments, the processor is configured to recognize choke points proximate to any of the one or more apertures.

In accordance with additional or alternative embodiments, the processor is configured to estimate a location and geometry of any of the one or more apertures.

In accordance with additional or alternative embodiments, the processor is configured to determine one or more of the location and the orientation of each of the one or more sensors relative to the at least one of the one or more apertures as one or more of an offset, a yaw, a pitch and a roll of the corresponding one or more of the one or more sensors relative to a defined point of the at least one of the one or more apertures from the analyses of the tracking of the individuals.

In accordance with additional or alternative embodiments, the analyses of the tracking of the individuals generate a position of the at least one of the one or more apertures from which one or more of the location and the orientation of the corresponding one or more of the one or more sensors are derivable.

In accordance with additional or alternative embodiments, an elevator system is provided and includes a controller which is operable based on readings of the one or more sensors of the self-calibrating sensor system according to claim 1 once one or more of the location and the orientation of the each of the one or more sensors relative to the at least one of the one or more apertures are determined.

In accordance with additional or alternative embodiments, one or more automatic door systems are provided and include a controller which is operable based on readings of the one or more sensors of the self-calibrating sensor system according to claim 1 once one or more of the location and the orientation of each of the one or more sensors relative to the at least one of the one or more apertures are determined.

In accordance with additional or alternative embodiments, the controller is further operable based on feedback readings of additional sensors.

According to another aspect of the disclosure, a method of installing a self-calibrating sensor system is provided and includes supportively disposing a sensor on or proximate to a wall defining an aperture, configuring the sensor to track individuals proximate to the aperture and determining one or more of a location and an orientation of the sensor relative to the aperture from analyses of the tracking of the individuals.

According to yet another aspect of the disclosure, a method of operating a self-calibrating sensor system is provided. The method includes supportively disposing a sensor on or proximate to a wall defining an aperture, activating the sensor to track individuals proximate to the aperture and determining one or more of a location and an orientation of the sensor relative to the aperture from analyses of the tracking of the individuals.

In accordance with additional or alternative embodiments, the sensor includes a depth sensor.

In accordance with additional or alternative embodiments, the activating of the sensor to track the individuals is responsive to an external command.

In accordance with additional or alternative embodiments, the activating of the sensor to track the individuals is automatic.

In accordance with additional or alternative embodiments, the determining includes determining one or more of the location and the orientation of the sensor relative to the aperture as one or more of an offset, a yaw, a pitch and a roll of the sensor relative to a determined point of the aperture from the analyses of the tracking of the individuals.

In accordance with additional or alternative embodiments, the analyses of the tracking of the individuals include generating a position of the aperture with a weighted uncertainty from which one or more of the location and the orientation of the sensor are derivable.

In accordance with additional or alternative embodiments, a method of operating an elevator system is provided and includes issuing an elevator call to bring an elevator to the aperture based on readings of the sensor of the self-calibrating sensor system following the determining of one or more of the location and the orientation of the sensor relative to the aperture.

In accordance with additional or alternative embodiments, a method of operating an automatic door system is provided and includes automatically operating automatic doors based on readings of the sensor of the self-calibrating sensor system following the determining of one or more of the location and the orientation of the sensor relative to the aperture.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 3 is a top-down view of a self-calibrating sensor system deployed in an elevator system in accordance with embodiments;

FIG. 4 is a schematic diagram of a structure of the self-calibrating sensor system of FIGS. 1-3 in accordance with embodiments;

DETAILED DESCRIPTION

As will be described below, a self-calibrating sensor is provided for elevator systems and for automatic door systems so that, if the self-calibrating sensor is installed at an off-center position relative to the corresponding elevator doors or automatic doors, the self-calibrating sensor can self-calibrate and remove any need for the installer to manually measure and enter position data. The self-calibrating sensor operates by automatically detecting the door location relative to the self-calibrating sensor from observed traffic and then by computing geometric parameters for intent determination logic. That is, a statistical analysis of trajectories and queuing behaviors of individuals proximate to the elevator or automatic doors indicates the location of those doors. Specifically, statistical clustering (e.g., using expectation-maximization algorithms) of end-points of trajectories defined as the locations where the trajectories are lost indicates choke points in person-flows. The choke points, which might be at an adjoining hallway, at an elevator door, or at an automatic door, may be statistically distinguished from other points where tracks originate or are lost by velocity and queuing (e.g., by using Gaussian mixture models of velocity and location with appropriate thresholds). Once the door locations are known, the specific geometric parameters may be computed (e.g., as ±3σ of a linear Gaussian fit across door location). In addition, while some sensors do not detect individuals closer than about 0.5 m-1.0 m from the doors, the following disclosure includes a sophisticated trajectory analysis that may be applied to compute an uncertainty to "weight" estimations. In the case of multiple doors, the estimations may be weighted by intent computed using learning-based approaches such as deep learning algorithms. Finally, it is to be understood that the amount of person-flow data that is needed for accurate parameter determinations will depend on elevator or automatic door usage. This amount of data may be determined automatically by monitoring the convergence of the parameter estimates.

Figure 1:
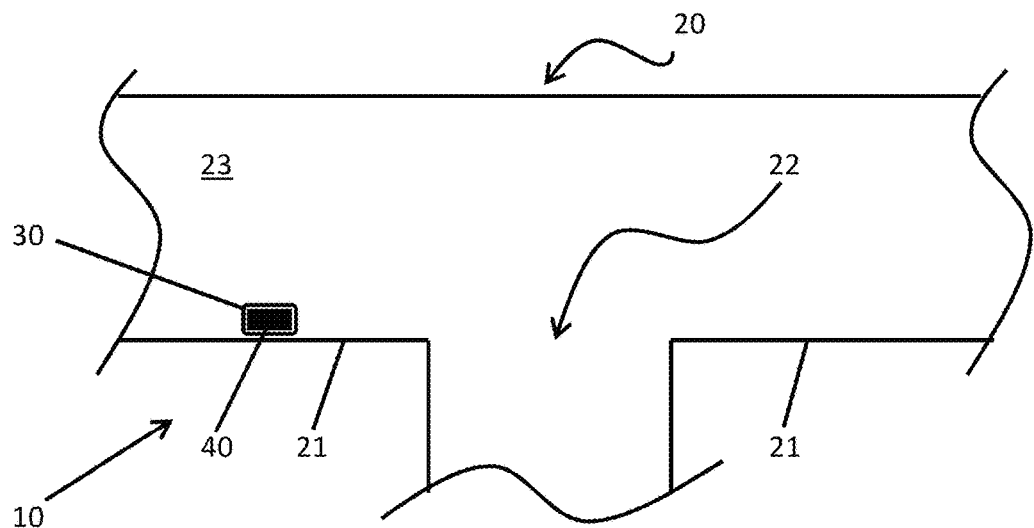
FIG. 1 is a top-down view of a self-calibrating sensor system in accordance with embodiments.
Figure 2:
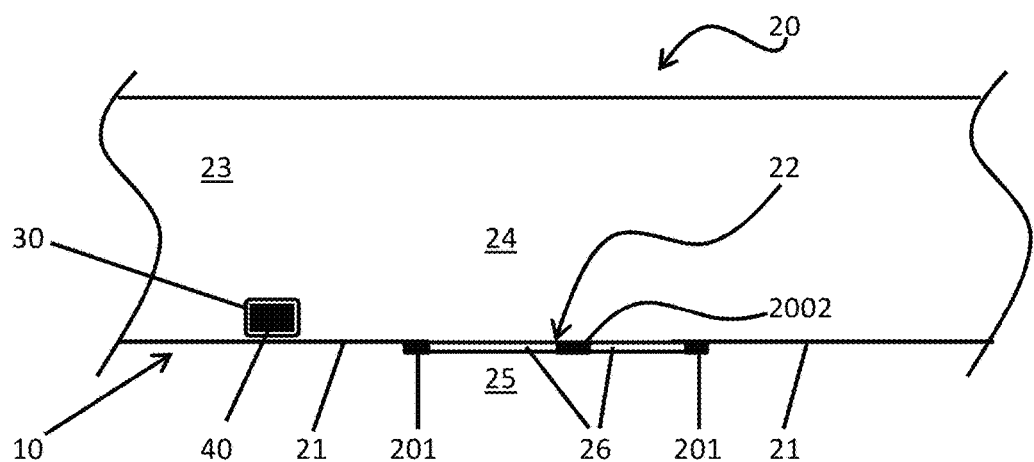
FIG. 2 is a top-down view of a self-calibrating sensor system deployed in an automatic door system in accordance with embodiments.

With reference to FIGS. 1-3, a self-calibrating sensor system 10 is provided and deployed for use in an environment 20. As shown in FIGS. 1-3, the environment 20 includes a wall 21 which is formed to define an aperture 22 and a walkway 23 that runs along the wall 21 and the aperture 22. In accordance with embodiments, the environment 20 may be provided as a simple set of walkways where the aperture 22 leads from walkway 23 to another walkway (see FIG. 1). In accordance with alternative embodiments, the environment 20 may be provided as an automatic door system including a controller 201 where the aperture 22 leads from an interior space 24 to an exterior space 25 and is opened and closed by automatic doors 26 under the control of the controller 201 (see FIG. 2). In accordance with still other alternative embodiments, the environment 20 may be provided as an elevator lobby including a controller 202 in which the aperture 22 leads to an elevator that is accessible via elevator doors 28 that open and close based on the elevator being appropriately positioned after being called by the controller 202 issuing an elevator call signal (see FIG. 3).

In any case, with additional reference to FIG. 4, the self-calibrating sensor system 10 includes a sensor assembly housing 30 which is supportively disposed on or proximate to the wall 21, a sensor 40 which is housed in the sensor assembly housing 30 and which is configured to track individuals proximate to the aperture 22 and a processing unit 50. The processing unit 50 may include a processor 501 and a memory unit 502 having executable instructions stored thereon, which, when executed, cause the processor 501 to determine a location and an orientation of the sensor 40 relative to the aperture 22 from analyses of the tracking of the individuals. The sensor housing 30 may be provided as any type of housing but may be configured such that when it is supportively disposed on or proximate to the wall 21, the sensor 40 may be but is not required to be positioned at or close to a center-point of the aperture 22.

In accordance with further embodiments, the self-calibrating sensor system 10 may further include a user or operator interface device 60 that can be used in some cases to initiate self-calibration. As shown in FIG. 4, the user or operator interface device 60 may be a simple button 61 or switch that is actuated by an operator to engage the sensor 40 (and the subsequent operations of the processor 501) and/or to engage the processor 501 directly (e.g., to input a command to the processor 501 to engage the sensor 40 (and the subsequent operations of the processor 501). Whether the self-calibrating sensor system 10 includes the user or operator interface device 60 or not, it is to be understood that the processor 501 may be configured to engage the sensor 40 automatically based on a predefined schedule or based on an external disturbance that may dislodge or move the sensor assembly housing 30 relative to the aperture 22.

For convenience of exposition, a world coordinate system is defined as a z-axis orthogonal to wall 21, an x-axis along wall 21 and parallel to the floor of walkway 23, and a y-axis along wall 21 and orthogonal to the floor of walkway 23. The world coordinate system may be centered on the floor of walkway 23 at the center-point of aperture 22, although any other convenient point may be used. In those cases in which the sensor 40 is disposed on the wall 21 but offset in x, y, and z from the origin of the world coordinate system, in particular, it is to be understood that the sensor 40 may have a predefined z-axis position which represents the distance between the sensor itself and a plane of the wall 21 (e.g., about 1 inch from the plane of the wall 21). In those cases in which the sensor 40 is disposed on the wall 21 but with an orientation in yaw from a defined 0° orientation, sensor 40 may have a predefined roll characteristic which is representative of an angular orientation of the sensor 40 about the z-axis (e.g., 0°), a yaw characteristic which is representative of an angular orientation of the sensor 40 about the y-axis, and a predefined pitch characteristic which is representative of an angular orientation of the sensor 40 about the x-axis (e.g., −40°). As such, the distance of the sensor 40 from the origin of the world coordinate, which is to be understood as the x-axis and y-axis position of the sensor 40 and the yaw characteristic of the sensor 40 which is representative of the angle about the y-axis need to be ascertained and determined.

In accordance with embodiments, once the x-axis and y-axis position of the sensor 40 and the yaw characteristic of the sensor 40 are ascertained and determined, the sensor 40 may be further employed to reliably sense and track individuals proximate to the aperture 22 so that additional and further decisions can be made as detailed below. For example, in the case of the environment 20 being provided as an automatic door system as shown in FIG. 2, the controller 201 will open and close the automatic doors 26 when the sensor 40, having already been self-calibrated, subsequently reliably senses that an individual intends to imminently pass through the aperture 22. For another example, in the case of the environment 20 being provided as an elevator system as shown in FIG. 3, the controller 202 will issue the elevator call signal to call the elevator to the aperture 22 when the sensor 40, having already been self-calibrated, subsequently reliably senses that an individual intends to imminently enter the elevator through the aperture 22. As other examples, when the sensor 40 has been self-calibrated, the controller 202 can be used to recognize when passengers hold doors open for (late-arriving) passengers, to count a number of people waiting near the doors to prioritize different calls and to count a number of people waiting to plan available capacity for picking up passengers at the given floor as well as subsequent floors.

To one or more of these ends, the sensor 40 may be provided as a depth sensor. Various 2D and 3D depth sensing sensor technologies and devices that can be used in sensor system 10 include, but are not limited to, a structured light measurement, phase shift measurement, time of flight measurement, stereo triangulation device, sheet of light triangulation device, light field cameras, coded aperture cameras, computational imaging techniques, simultaneous localization and mapping (SLAM), imaging radar, imaging sonar, echolocation, laser radar, scanning light detection and ranging (LIDAR), flash LIDAR or a combination thereof. Different technologies can include active (transmitting and receiving a signal) or passive (only receiving a signal) sensing and may operate in a band of the electromagnetic or acoustic spectrum such as visual, infrared, ultrasonic, etc. In various embodiments, a depth sensor may be operable to produce depth from defocus, a focal stack of images, or structure from motion.

Figure 5A:
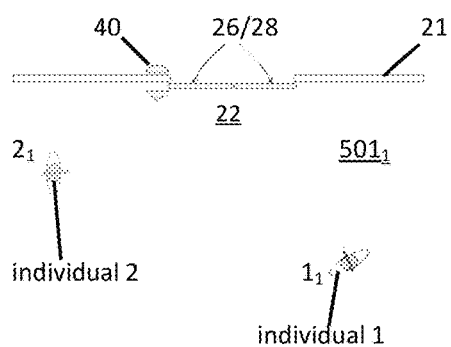
FIG. 5A is a graphical depiction of a spatial map generated by a processor of the self-calibrating sensor system of FIGS. 1-4.
Figure 5B:
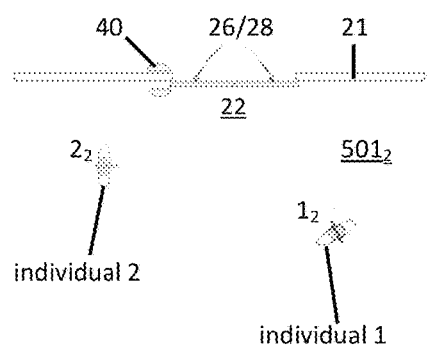
FIG. 5B is a graphical depiction of a spatial map generated by a processor of the self-calibrating sensor system of FIGS. 1-4.
Figure 5C:
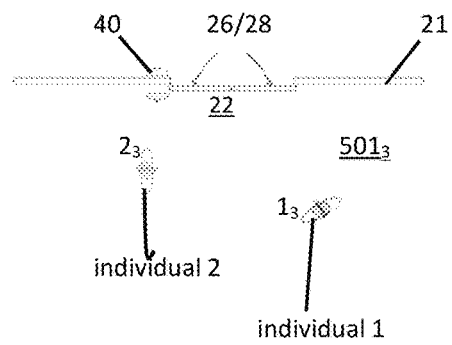
FIG. 5C is a graphical depiction of a spatial map generated by a processor of the self-calibrating sensor system of FIGS. 1-4.
Figure 5D:
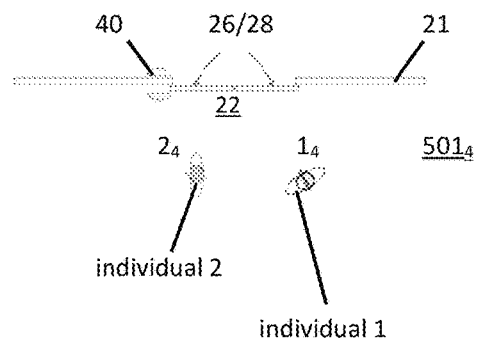
FIG. 5D is a graphical depiction of a spatial map generated by a processor of the self-calibrating sensor system of FIGS. 1-4.
Figure 6:
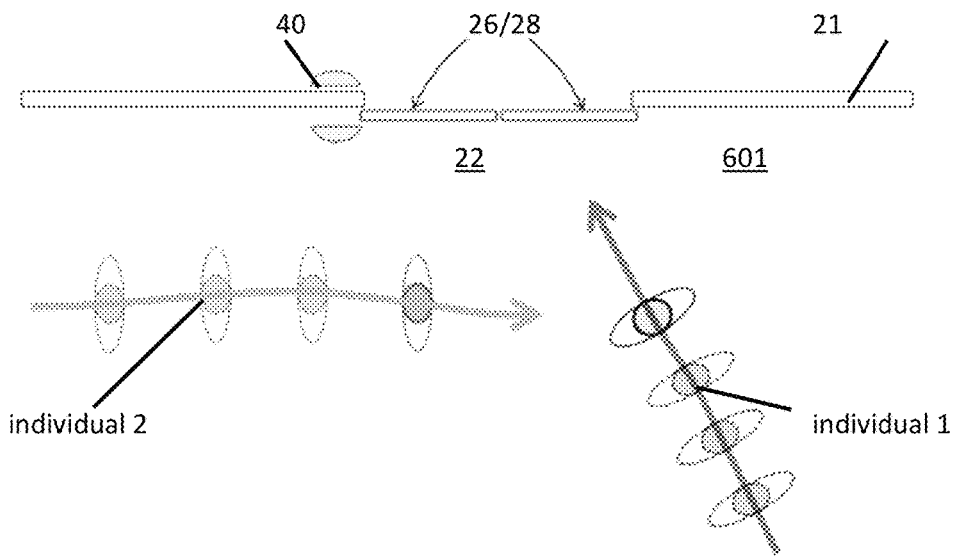
FIG. 6 is a comprehensive spatial map including the illustrations of the spatial maps of FIGS. 5A-D.

In any case, with reference to FIGS. 5A-D and FIG. 6, the sensor 40 may be configured to generate a series of spatial maps $501_{1-4}$ which are ordered in sequence according to time can be superimposed on one another in a comprehensive spatial map 601 for individuals proximate to the aperture 22 and thereby track the individuals based on the series of spatial maps $501_{1-4}$. Thus, as shown in FIG. 5A, spatial map $501_1$ indicates that individual 1 is in a first position $1_1$ relative to the aperture 22 and that individual 2 is in a first position $2_1$ relative to the aperture 22, as shown in FIG. 5B, spatial map $501_2$ indicates that individual 1 is in a second position $1_2$ relative to the aperture 22 and that individual 2 is in a second position $2_2$ relative to the aperture 22, as shown in FIG. 5C, spatial map $501_3$ indicates that individual 1 is in a third position $1_3$ relative to the aperture 22 and that individual 2 is in a third position $2_3$ relative to the aperture 22 and, as shown in FIG. 5D, spatial map $501_4$ indicates that individual 1 is in a fourth position $1_4$ relative to the aperture 22 and that individual 2 is in a fourth position $2_4$ relative to the aperture 22.

Therefore, comprehensive spatial map 601, which includes the indications of each of the spatial maps $501_{1-4}$, illustrates that from the tracking of individuals 1 and 2 across the spatial maps $501_{1-4}$, the processor 501 of the processing unit 50 can receive tracking data from the sensor 40 and thus determine that individual 1 is likely approaching the aperture 22 and that individual 2 is likely to be walking past the aperture 22. From these determinations, the processor 501 can estimate a location of the aperture 22 and thereby derive the location and the orientation of the sensor 40 relative to the aperture 22 as an x-axis and y-axis offset and a yaw of the sensor 40 relative to the center-point of the aperture 22. With such determinations and additional determinations having been made, the controller 201 of FIG. 2 may open the automatic doors 26 for individual 1 and the controller 202 of FIG. 3 may issue the elevator call signal to call the elevator to the aperture 22 for individual 1.

According to one or more embodiments, the tracking may be by detection and tracking processes such as background subtraction, morphological filtering, and a Bayesian Filtering method such as a Kalman Filter or a Particle Filter. Background subtraction to produce foreground object(s) may be achieved by a Gaussian Mixture Model, a Codebook Algorithm, Principal Component Analysis (PCA) and the like. Morphological filtering may be a size filter to discard foreground object(s) that are not persons (e.g., are too small, have an inappropriate aspect ratio and the like). A Bayesian Filter may be used to estimate the state of a filtered foreground object where the state may be position, velocity, acceleration and the like.

Figure 7:
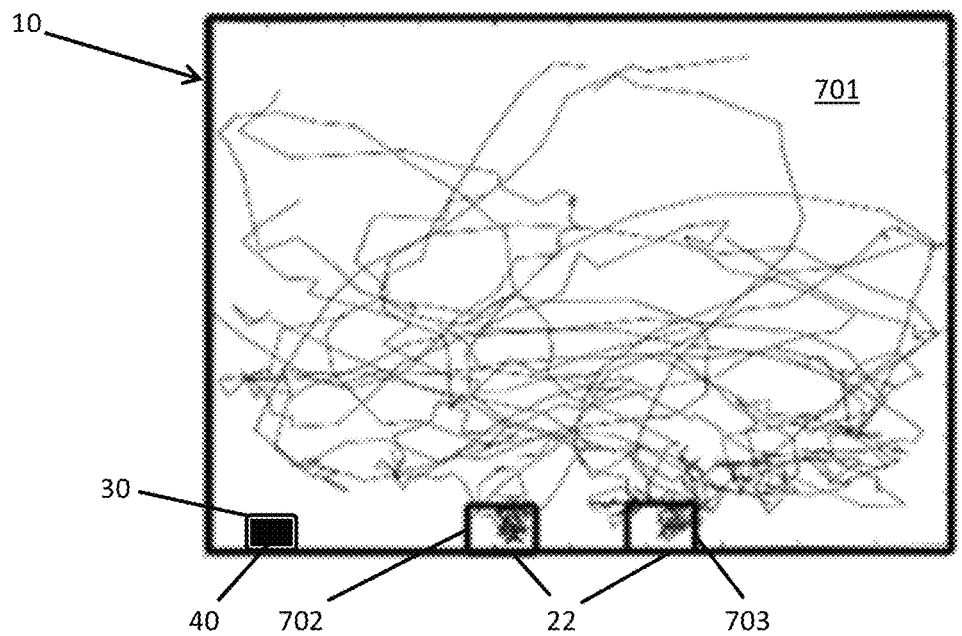
FIG. 7 is an actual comprehensive spatial map illustrating that multiple individuals are sensed and tracked.

While the illustrations of FIGS. 5A-D and FIG. 6 are those of simplified examples, it is expected that there would be a large number of individuals being sensed and tracked over time in an actual case. That is, with reference to FIG. 7, the processor 501 will actually receive tracking data that is representative of actual comprehensive spatial map 701 which shows that a large number of individuals are sensed and tracked over time by the sensor 40. Here, the processor 501 (see FIG. 4) can use statistical analyses of those individuals' trajectories and queuing behavior to determine the location of choke points 702, 703 which are understood to correspond to apertures 22. Specifically, the processor 501 may employ statistical clustering analyses (e.g., using expectation-maximization algorithms) of the end-points of the individuals' trajectories (where the trajectory is lost). The choke points 702, 703 may be statistically distinguished from other points where tracks originate or are lost by velocity and queuing (e.g., by the processor 501 employing Gaussian mixture models of velocity and location with appropriate thresholds).

As noted above, once the aperture 22 locations are known, the specific geometric parameters of the aperture 22, such as its height and width, may be computed (e.g., as ±3σ of a linear Gaussian fit across aperture 22 location) and the location and the orientation of the sensor 40 relative to the aperture 22 can be derived as an x-axis and y-axis offset and a yaw of the sensor 40 relative to a defined point of the aperture 22, such as its midline at a predefined height, by geometric analysis from the defined point of the aperture 22. In one embodiment, this geometric analysis includes computing the pitch, yaw and roll angles between the optical axis of sensor 40 and the world coordinate system where the world coordinate system is translated to the location of sensor 40.

Figure 8:
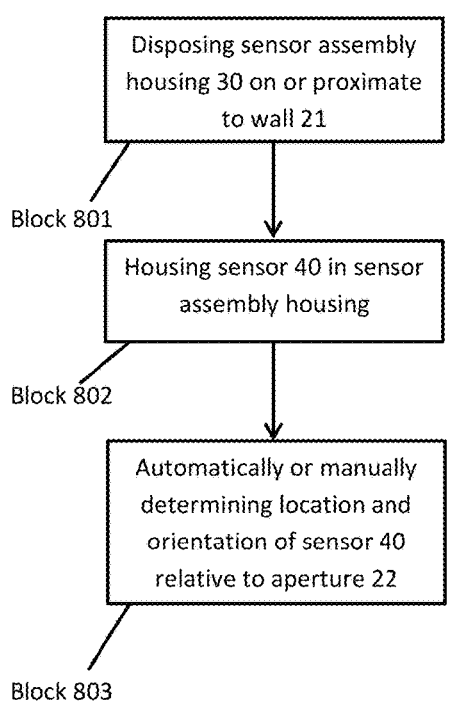
FIG. 8 is a flow diagram illustrating a method installing a self-calibrating sensor system in accordance with embodiments.

With reference to FIG. 8, a method of installing the self-calibrating sensor system 10 described above is provided. The method includes supportively disposing the sensor assembly housing 30 on or proximate to the wall 21 defining the aperture 22 (block 801), housing the sensor 40 in the sensor assembly housing 30 with the sensor 40 being configured to track individuals proximate to the aperture 22 (block 802) and automatically or manually determining a location and an orientation of the sensor 40 relative to the aperture 22 from the analyses of the tracking of the individuals (block 803).

Figure 9:
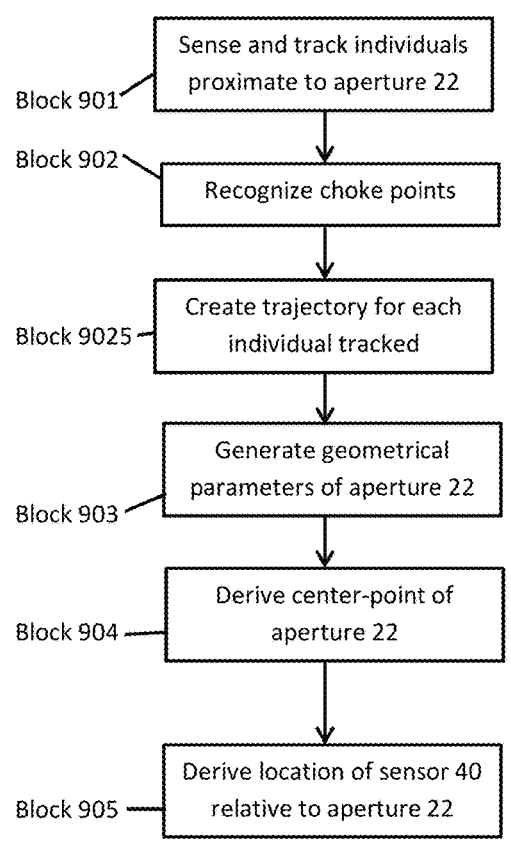
FIG. 9 is a flow diagram illustrating a method of sensor self-calibration for a self-calibrating sensor system in accordance with embodiments.

With the self-calibrating sensor system 10 installed as described in FIG. 8, a method of sensor self-calibration of the self-calibrating sensor system 10 will now be described with reference to FIG. 9. As described in FIG. 9, the sensor 40 senses and tracks all of the individuals proximate to the aperture 22 (block 901) and then the processor 501 creates a trajectory for each individual tracked (block 9015) to thereby generate and/or otherwise recognize choke points which are understood to be in front of or proximate to apertures 22 (block 902). Once these choke points are recognized, in some, but not all cases, Gaussian mixture models or other similar algorithms are employed to generate geometrical parameters of the apertures 22 (block 903) from which a center-point of each aperture 22 can be derived (block 904). Once these center-points are derived, x-axis and y-axis and yaw characteristics of the sensor 40 relative to the center-points can be derived from additional sensing operations to determine the location of the sensor 40 relative to the center-points of the apertures 22. Once the location of the sensor 40 is determined, additional determinations can be made based on further operations of the sensor 40 while further self-calibration can be executed automatically or manually over time.

The self-calibration systems and methods described herein are generally described as open-loop systems and methods that rely on analyzing trajectories and queueing behavior unto themselves and inferring that, because a lot of people seem to be heading towards a given point the door must be or is probably at that given point. However, it is to be understood that other embodiments exist in which the processor 501 receives inputs from the sensor 40 as well as "feedback" inputs from the doors/aperture(s) 22. For example, the processor 501 could receive a signal when the doors are open and when they are closed from an additional sensor 2002 (see FIG. 2). Then the processor 501 can make a higher-confidence estimation that the cluster of trajectories presumed to be heading to a door is correct since there would probably be markedly different behavior reflecting trajectories when the doors are closed (i.e., people slowing down and stopping as they approach the door) versus when the doors are open (e.g., people moving expeditiously towards the door).

In addition, the sensor 40 or an additional sensor may be configured to detect when people are actually passing through the doors/aperture(s) 22 and could be employed to improve operations that correlate people's trajectories with instances of those people indeed passing through the doors. The timing between when the trajectory ends and when someone passes through the doors can also be used as additional information that improves the door control as to how long doors need to be held open before closing. This would help to distinguish case where there are several places that a person could be walking toward, not just the door in question, but also people passing by along a walkway (not using the door) if such people can be seen by the sensor. For example, as in FIG. 1, there might be three "sinks" where the trajectories end. These include towards the west end of the walkway, towards the east end of the walkway and the door. Here, statistical clustering could determine that these three sinks exist and knowing the status of the door would be helpful in doing so. Furthermore, if the systems and methods are disposed to control multiple doors, the open/closed status of each of the doors would be helpful in associating clustering with corresponding doors.

The self-calibrating sensor system 10 described herein provides for automatic calibration of a sensor 40 under a wide variety of installation conditions and applications. Thus, intent logic parameters computed from installation-specific observations will be more accurate than pre-computed, generic parameters and will result in, for example, fewer unnecessary hall calls, missed hall calls, or unnecessary opening of an automatic door.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A self-calibrating sensor system for use in an environment in which a wall defines one or more apertures, the self-calibrating sensor system comprising:
   one or more sensors supportively disposed on or proximate to the wall defining the one or more apertures,
   each of the one or more sensors being configured to track individuals proximate to at least one of the one or more apertures as the individuals move across the environment; and
   a processor configured to determine one or more of a location and an orientation of each of the one or more sensors relative to the at least one of the one or more apertures from analyses of the tracking of the individuals as the individuals move across the environment.

2. The self-calibrating sensor system according to claim 1, wherein at least one of the one or more sensors comprises a depth sensor.

3. The self-calibrating sensor system according to claim 1, wherein the processor is configured to activate the one or more sensors to sense the individuals for tracking and to receive data associated with the sensing from the one or more sensors.

4. The self-calibrating sensor system according to claim 3, wherein the processor activates the one or more sensors to sense the individuals for tracking in response to an external command.

5. The self-calibrating sensor system according to claim 1, wherein the processor is configured to recognize choke points proximate to any of the one or more apertures.

6. The self-calibrating sensor system according to claim 1, wherein the processor is configured to estimate a location and geometry of any of the one or more apertures.

7. The self-calibrating sensor system according to claim 1, wherein the processor is configured to determine one or more of the location and the orientation of each of the one or more sensors relative to the at least one of the one or more apertures as one or more of an offset, a yaw, a pitch and a roll of the corresponding one or more of the one or more sensors relative to a defined point of the at least one of the one or more apertures from the analyses of the tracking of the individuals.

8. The self-calibrating sensor system according to claim 1, wherein:
the analyses of the tracking of the individuals as the individuals move across spatial maps of the environment generate a position of the at least one of the one or more apertures, and
one or more of the location and the orientation of the corresponding one or more of the one or more sensors are derivable from the position of the at least one of the one or more apertures.

9. An elevator system comprising a controller which is operable based on readings of the one or more sensors of the self-calibrating sensor system according to claim 1 once one or more of the location and the orientation of the each of the one or more sensors relative to the at least one of the one or more apertures are determined.

10. One or more automatic door systems comprise a controller which is operable based on readings of the one or more sensors of the self-calibrating sensor system according to claim 1 once one or more of the location and the orientation of each of the one or more sensors relative to the at least one of the one or more apertures are determined.

11. The one or more automatic door systems according to claim 10, wherein the controller is further operable based on feedback readings of additional sensors.

12. A method of installing a self-calibrating sensor system in an environment in which a wall defines an aperture, the method comprising:
supportively disposing a sensor on or proximate to the wall defining the aperture;
configuring the sensor to track individuals proximate to the aperture as the individuals move across the environment;
determining a position of the aperture from analyses of the tracking of the individuals as the individuals move across the environment and
deriving one or more of a location and an orientation of the sensor relative to the aperture from the position of the aperture.

13. A method of operating a self-calibrating sensor system in an environment in which a wall defines an aperture, the method comprising:
supportively disposing a sensor on or proximate to the wall defining the aperture;
activating the sensor to track individuals proximate to the aperture as the individuals move across the environment;
determining a position of the aperture from analyses of the tracking of the individuals as the individuals move across the environment and
deriving one or more of a location and an orientation of the sensor relative to the aperture from the position of the aperture.

14. The method according to claim 13, wherein the sensor comprises a depth sensor.

15. The method according to claim 13, wherein the activating of the sensor to track the individuals is responsive to an external command.

16. The method according to claim 13, wherein the activating of the sensor to track the individuals is automatic.

17. The method according to claim 13, wherein the determining comprises determining one or more of the location and the orientation of the sensor relative to the aperture as one or more of an offset, a yaw, a pitch and a roll of the sensor relative to a determined point of the aperture from the analyses of the tracking of the individuals.

18. The method according to claim 13, wherein the analyses of the tracking of the individuals comprise generating a position of the aperture with a weighted uncertainty from which one or more of the location and the orientation of the sensor are derivable.

19. A method of operating an elevator system comprising issuing an elevator call to bring an elevator to the aperture based on readings of the sensor of the self-calibrating sensor system according to claim 13 following the determining of one or more of the location and the orientation of the sensor relative to the aperture.

20. A method of operating an automatic door system comprising automatically operating automatic doors based on readings of the sensor of the self-calibrating sensor system according to claim 13 following the determining of one or more of the location and the orientation of the sensor relative to the aperture.

* * * * *